(12) United States Patent
Lewis et al.

(10) Patent No.: US 12,479,321 B2
(45) Date of Patent: Nov. 25, 2025

(54) ELECTRIC VEHICLE CORDSET FAULT STATUS HUMAN-MACHINE INTERFACE

(71) Applicant: GM Global Technology Operations LLC, Detroit, MI (US)

(72) Inventors: Allan Kenneth Lewis, Windsor (CA); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 896 days.

(21) Appl. No.: 17/720,746

(22) Filed: Apr. 14, 2022

(65) Prior Publication Data

US 2023/0331109 A1    Oct. 19, 2023

(51) Int. Cl.
*B60L 53/60* (2019.01)
*B60L 53/16* (2019.01)
*B60L 53/18* (2019.01)

(52) U.S. Cl.
CPC ............... *B60L 53/60* (2019.02); *B60L 53/16* (2019.02); *B60L 53/18* (2019.02)

(58) Field of Classification Search
CPC ........... B60L 53/60; B60L 53/16; B60L 53/18
USPC ........................................................ 320/109
See application file for complete search history.

(56) References Cited

U.S. PATENT DOCUMENTS

| | | | | |
|---|---|---|---|---|
| 2011/0202418 A1* | 8/2011 | Kempton | ................ | B60L 53/63 705/26.1 |
| 2011/0279082 A1* | 11/2011 | Hagenmaier, Jr. | ...... | B60L 53/18 320/109 |
| 2012/0206100 A1* | 8/2012 | Brown | ..................... | B60L 53/18 320/109 |
| 2013/0300429 A1* | 11/2013 | Jefferies | .................. | B60L 53/31 324/511 |
| 2014/0015482 A1* | 1/2014 | Nitzberg | ............... | B60L 53/305 320/109 |
| 2014/0211345 A1* | 7/2014 | Thompson | ............. | H01H 9/548 335/11 |
| 2016/0099581 A1* | 4/2016 | Kawamura | ........... | H02J 7/0048 320/107 |
| 2019/0164427 A1* | 5/2019 | Greenwood | ............. | G08G 1/14 |
| 2023/0208135 A1* | 6/2023 | Hacker Davidson | ........................ | F04D 25/0673 320/137 |
| 2023/0294536 A1* | 9/2023 | Simmons | ................ | B60L 53/66 320/109 |

FOREIGN PATENT DOCUMENTS

CN        116945903 A  * 10/2023  .............. B60L 53/16
WO    WO-2010022059 A1  * 2/2010   ............ B60L 53/126

* cited by examiner

*Primary Examiner* — Suresh Memula
(74) *Attorney, Agent, or Firm* — Vivacqua Crane, PLLC

(57) ABSTRACT

The present disclosure is directed to an electric vehicle cordset and system for identifying faults in an electric vehicle cordset. The electric vehicle cordset and system include a cordset controller. The cordset controller includes a cordset processor, a plurality of fault detection circuits connected to the cordset processor, and a first status light connected to the cordset processor. The cordset processor is configured to execute a set of instructions including identify a fault in one of the fault detection circuits, terminate power in the cordset, turn on the first status light indicating the fault is present, and encode the fault in the first status light through modulating the first status light.

20 Claims, 7 Drawing Sheets

ELECTRIC VEHICLE CORDSET FAULT STATUS HUMAN-MACHINE INTERFACE

Electric vehicles are charged with cordsets that connect the vehicle to a home electric wiring system or charging station power supply. For home based charging systems, some cordsets plug into standard 120V or 240V outlets and others are connected directly to the wiring system. The cordsets include a human-machine interface, including lights that provide indicators of the charging status of the cordset, including a status signal for charging and a status signal for identifying a fault, and, when a fault is detected, a status signal that is encoded through modulation to identify a specific fault. In one example, a cordset emits a green light to indicate that the cordset is charging, whereas a fault in the ability to charge is indicated by an amber light.

Cordsets may indicate the presence of particular faults by illuminating various combinations of the lights. However, the available number of light combinations is limited by the number of lights provided and it is not necessarily possible to specifically identify many of the faults that may occur or where the faults are located. In addition, interpreting the various light combinations by a user may result in misidentification of a fault.

Thus, while current cordset fault status indicators for electric vehicles achieve their intended purpose, there is a need for a new and improved system and process for providing cordset fault status indicators.

SUMMARY

According to a number of aspects, the present disclosure is directed to an electric vehicle cordset. The electric vehicle cordset includes a cordset controller. The cordset controller includes a cordset processor, a plurality of fault detection circuits connected to the cordset processor, and a first status light connected to the cordset processor. The cordset processor is configured to identify a fault in one of the plurality of fault detection circuits, terminate power in the cordset, turn on the first status light indicating the fault is present, and encode the fault in the first status light through modulating the first status light.

In aspects of the above, the fault is encoded by altering a duty cycle of the first status light.

In aspects of the above, the electric vehicle cordset further includes a cordset cable including a vehicle adapter at a first end of the cordset cable and wiring system adapter at a second end of the cordset cable, wherein the cordset controller is connected to the cordset cable.

In aspects of the above, the plurality of fault detection circuits includes one or more of the following: a grid plug overheat detection circuit, a ground fault detection circuit, a grid plug loss of ground detection circuit, and a controller internal failure detection circuit.

In aspects of the above, the cordset processor is further configured to turn off a second status light indicating the cordset is charging.

In further aspects, the second status light is green, and the first status light is amber.

According to further aspects, the present disclosure is directed to a system for identifying faults in an electric vehicle cordset. The system includes a cordset controller. The cordset controller includes a cordset processor, a plurality of fault detection circuits connected to the cordset processor, and a first status light connected to the cordset processor, wherein the cordset processor is configured to: identify a fault in one of the fault detection circuits, terminate power in the cordset, turn on the first status light indicating the fault is present, and encode the fault in the first status light through modulating the first status light. The system further includes an electric vehicle. The electric vehicle includes a first visual processing module, a first light sensor connected to the first visual processing module, and a first display connected to the first visual processing module. The first light sensor is configured to detect light emitted by the first status light, the first visual processing module is configured to decode the fault encoded in the modulated first status light, and the first display is configured to display the fault decoded by the first visual processing module.

In aspects of the above, the fault is encoded by altering a duty cycle of the first status light.

In aspects of the above, the plurality of fault detection circuits includes one or more of the following: a grid plug overheat detection circuit, a ground fault detection circuit, a grid plug loss of ground detection circuit, and a controller internal failure detection circuit.

In further aspects of the above, the cordset controller is further configured to turn off a second status light indicating the cordset is charging.

In further aspects of the above, the system also includes a communication system, wherein the communication system is configured to transfer the fault to an external entity.

In any of the above aspects, the system further includes an external diagnostic visualizer.

In aspects of the above the external diagnostic visualizer includes an external visual processing module, an external light sensor connected to the external visual processing module, and an external display connected to the external visual processing module. The external light sensor is configured to detect light emitted by the first status light, the external visual processing module is configured to decode the fault encoded in the modulated first status light, and the external display is configured to display the fault decoded by the external visual processing module.

In aspects of the above, the external diagnostic visualizer also includes an external communication system, wherein the external communication system is configured to transfer the fault to an external entity.

In any of the above aspects, the external diagnostic visualizer is a smart phone. Alternatively, in any of the above aspects, the external diagnostic visualizer is a diagnostics unit.

According to additional aspects, the present disclosure is directed a method of identifying faults in an electric vehicle cordset. The method includes identifying a fault in a cordset with a fault detection circuit included in a cordset controller, terminating power in the cordset, indicating the fault is present with a first status light in the cordset controller, and encoding the fault in the first status light through modulating the first status light using a cordset processor included in the cordset controller.

In aspects of the above, the method further includes detecting light emitted by the first status light with a first light sensor, decoding the fault encoded in the first status light with a first visual processing module, and displaying the fault decoded by the first visual processing module with a first display.

In aspects of the above, the method further includes transferring the fault to an external entity with a first communication system.

In aspects of the above, the method further includes detecting light emitted by the first status light with an external light sensor, decoding the fault encoded in the first status light with an external visual processing module, and displaying the fault decoded by an external visual processing module with an external display.

BRIEF DESCRIPTION OF THE DRAWINGS

The drawings described herein are for illustration purposes only and are not intended to limit the scope of the present disclosure in any way.

DETAILED DESCRIPTION

Figure 1:
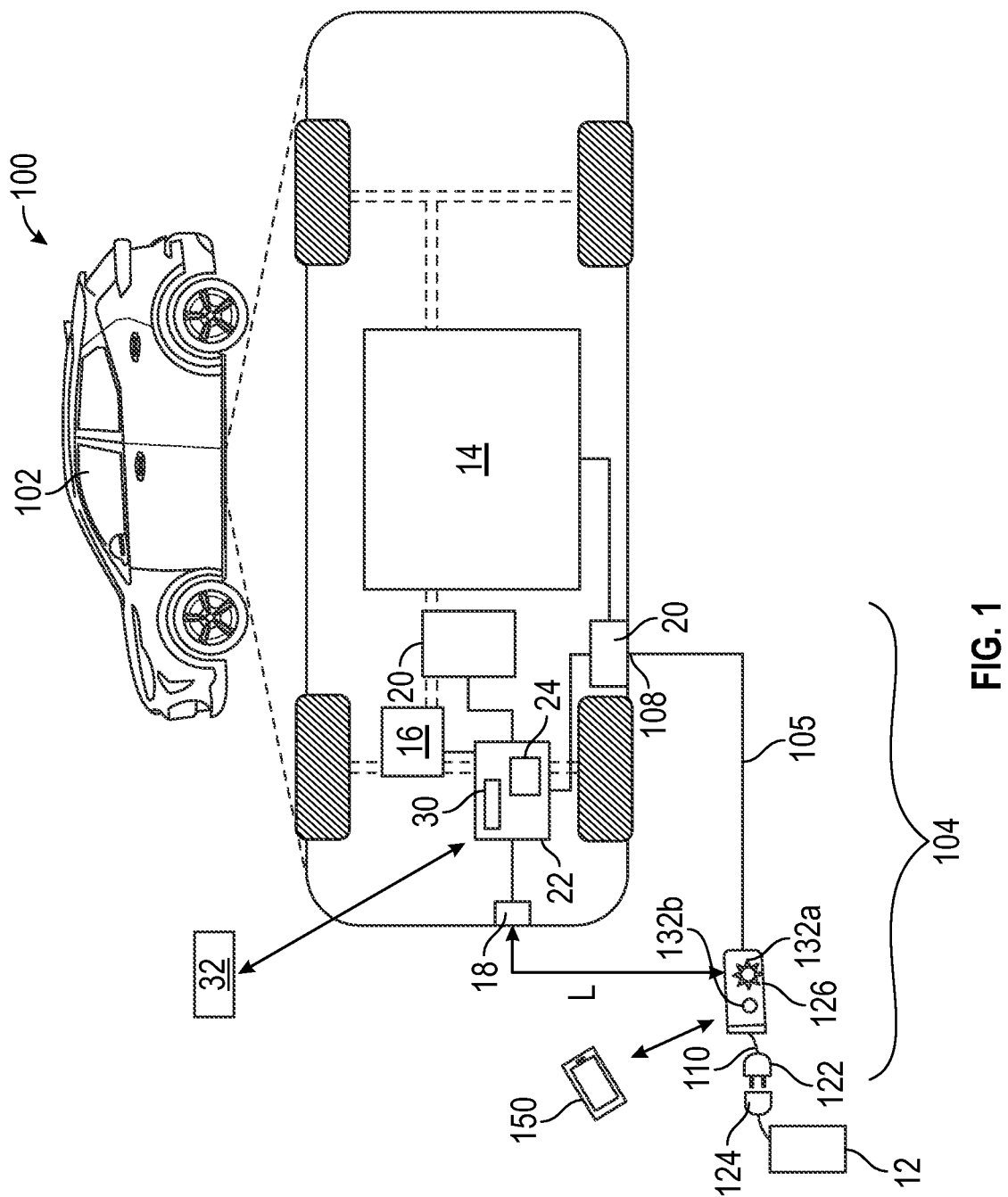
FIG. 1 illustrates a schematic of an electric vehicle, a cordset for charging the electric vehicle, and an external diagnostic visualizer according to aspects of the present disclosure.

The present disclosure relates to a system and process of indicating the functional status of an electric vehicle changing cordset to a user via an electric vehicle cordset fault status human-machine interface. The status of the cordset is encoded into a first status light, by altering the duty cycle to modulate the light emitted by the first status light to optically transmit the encoded light signal to a light sensor present in a vehicle or an external diagnostic visualizer. A visual processing module then decodes and communicates the status of the cordset to a user via a display associated with either the vehicle or the external diagnostic visualizer, to identify the nature of any faults as well as the location of any faults, such as in the electric vehicle, the cordset, or the power supply. The light signal may also provide to the user an initial visual indication of the general status of the charger, including whether the charger is providing a charge or whether a fault is present.

FIGS. 1 through 4 illustrates aspects of a system for indicating the functional status of an electric vehicle changing cordset. The system includes an electric vehicle 100 and a cordset 104 for coupling the electric vehicle 100 to a power supply 12. The electric vehicle 100 includes, for example, an all-electric vehicle or hybrid-plug-in electric vehicle. While a hatchback is illustrated, the electric vehicle 100 may include any electric vehicle such as a sedan, truck, hatchback, all-terrain vehicle, motorcycle, etc. The electric vehicle 100 includes a battery 14 to provide power to the powertrain 16 of the electric vehicle 100 as well as other systems in the electric vehicle 100. In addition, the electric vehicle 100 includes a first light sensor 18, a first electronic control unit 22, and a first display 20.

The first light sensor 18 may be positioned anywhere on the electric vehicle 100, provided the first light sensor 18 is in a position where it is capable of detecting light L emitted from the cordset 104. As illustrated in FIG. 1, the first light sensor 18 is positioned in the front of the electric vehicle 100. Alternatively, or additionally, the first light sensor 18 may be positioned on either side of the vehicle or in the rear of the vehicle, or in aspects in the cabin 102. The first light sensor 18 may be, for example, a photo-sensor, a complementary metal-oxide-semiconductor, and a charged coupled device. In aspects, the first light sensor 18 is configured to detect light at wavelengths and frequencies emitted from the cordset 104, wherein the wavelengths may be in the range of visible light or may be infrared or ultraviolet light outside of the visible spectrum.

Figure 2:
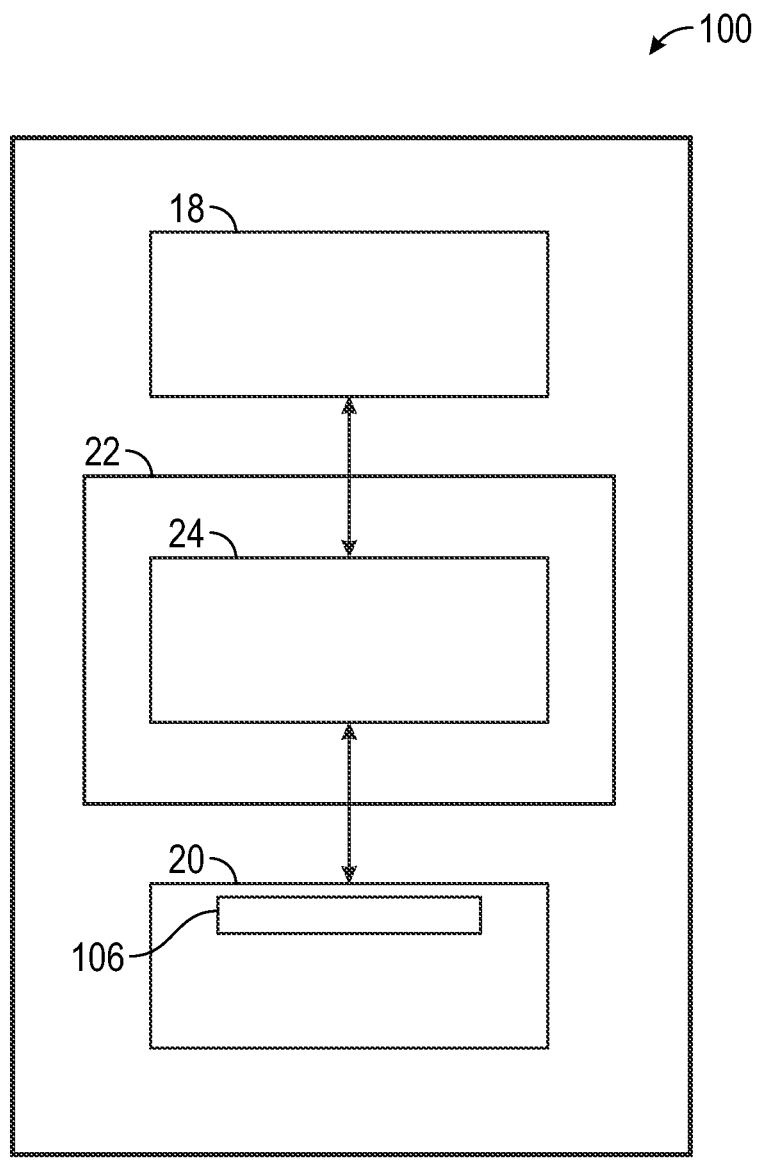
FIG. 2 illustrates a schematic diagram of a visual processing module with an associated sensor and display unit present in an electric vehicle according to aspects of the present disclosure.

As illustrated in FIG. 2, the first light sensor 18 is connected to the first visual processing module 24 in the electronic control unit 22. The electronic control unit 22 regulates the power delivered to and from the battery 14 to the powertrain 16 and various other subsystems of the electric vehicle 100. The visual processing module 24 in the electronic control unit 22 may include a custom made or commercially available processor, a central processing unit (CPU), a graphics processing unit (GPU), an auxiliary processor among several processors associated with the first visual processing module 24, a semiconductor-based microprocessor (in the form of a microchip or a chip set), a microprocessor, a combination thereof, or generally a device for executing instructions. In aspects, more than one visual processing module 24 may be present, wherein processing may be distributed across the multiple visual processing modules 24.

In addition, with further reference to FIG. 2, the electric vehicle 100 includes a first display 20. The first display 20 is located in the cabin 102 of the electric vehicle 100 (see FIG. 1) and is visually accessible to users within the electric vehicle 100. The first display 20 includes a graphic user interface 106 that the user may interact with using, for example, a touch screen integrated into the graphic user interface 106 or an electro-mechanical interface placed elsewhere in the cabin 102. The first display 20 is configured to indicate to the user the fault status of the cordset 104, should a fault arise.

With reference again to FIG. 1, the electric vehicle 100 may also include a first communication system 30 configured to wirelessly communicate information from the electronic control unit 22 to an external entity 32, such as but not limited to, other vehicles ("V2V" communication), infrastructure ("V2I" communication), remote systems at a remote call center (e.g., ON-STAR by GENERAL MOTORS) and/or personal devices such as an external diagnostic visualizer 150. In certain embodiments, the first communication system 30 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the first communication system 30 may include one or more antennas and/or transceivers for receiving and/or transmitting signals, such as cooperative sensing messages (CSMs).

In aspects, the power supply 12 is a household or building wiring system. In alternative aspects, the power supply 12 is a free-standing charging station. And in yet further aspects, the power supply 12 is a generator or a battery. As alluded to above, the cordset 104 includes a cordset cable 105 that includes a plurality of wires that connects the electric vehicle 100 to the power supply 12. The cordset 104 includes a vehicle adapter 120 that connects the cordset 104 to the vehicle 100 at one end 108 and a wiring system adapter 122 that connects the cordset 104 to the power supply 12 at the other end 110. In aspects, the wiring system adapter 122 includes a 120 V or a 240 V plug and the power supply 12 includes a 120 V or 240 V receptacle 124 for receiving the wiring system adapter 122. The cordset 104 also includes a cordset controller 126, which monitors the status of the cordset 104 and provides an indication of the charging status as further described herein.

Figure 3:
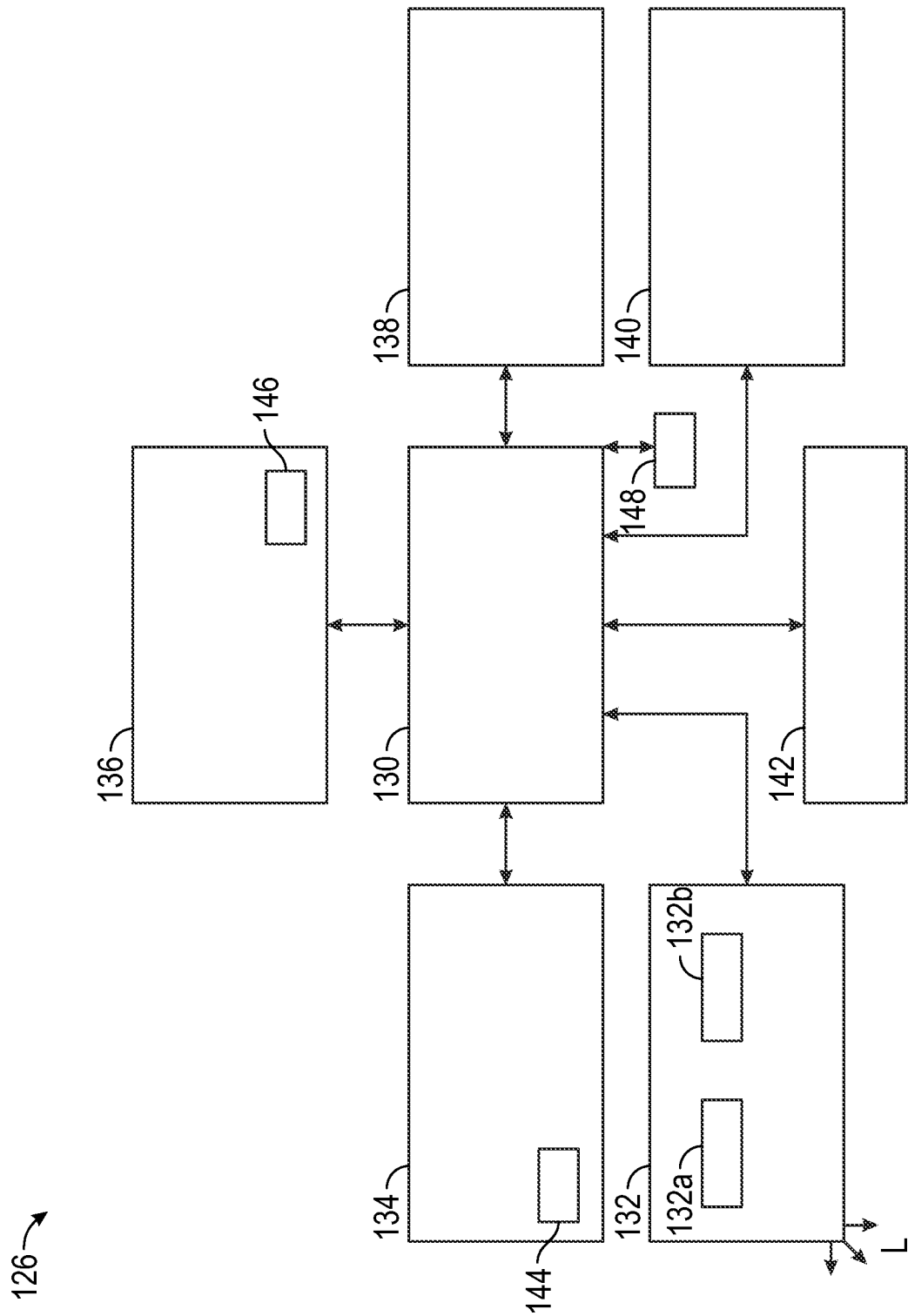
FIG. 3 illustrates a schematic diagram of an embodiment of a cordset controller according to aspects of the present disclosure.

FIG. 3 illustrates a block diagram of the cordset controller 126. The cordset controller 126 includes a cordset processor 130 and one or more status lights. In addition, the cordset controller 126 includes a number of circuits for detecting faults including, but not limited to, one or more of the following: a grid plug overheat detection circuit 134, a ground fault detection circuit 136, a grid plug loss of ground detection circuit 138 and a controller internal failure detection circuit 140. Further, the cordset controller 126 includes a non-transitory computer readable storage device 142.

The cordset processor 130 may be a custom made or commercially available processor, a central processing unit (CPU), a graphics processing unit (GPU), an auxiliary processor among several processors associated with the cordset controller 126, a semiconductor-based microprocessor (in the form of a microchip or a chip set), a microprocessor, a combination thereof, or generally a device for executing instructions. The cordset processor 130, in aspects, includes a display driver circuit for driving the status lights 132. In aspects, more than one cordset processor 130 may be present, wherein processing is distributed across the multiple cordset processors 130, as in the case of parallel processing. The cordset controller 126 is programmed to execute instructions for communicating a fault status detected by the cordset processor 130 as described in detail below.

The status lights 132 provide a first human machine interface as well as a first machine-machine interface. In aspects status lights 132 include two lights 132a, 132b; however, in alternative aspects, one light may be present, or more than two lights may be present, such as 3 to 4 lights. The status lights 132 include a first status light 132a, used to indicate one or more faults in the cordset 104, and a second status light 132b, used to indicate that the cordset 104 is charging or ready to charge and may also be used in conjunction with the first status light 132a to indicate one or more faults in the cordset 104. The first status light may be, for example, an amber status light, and the second status light may be, for example, a green status light. The status lights 132 are light emitting diodes (LEDs) or other lights that may be modulated by altering the duty cycle in a controlled manner. The status lights 132 emit light L that is detected by, for example, the light sensor 18 associated with the electric vehicle 100 and any other external light sensors 154 that may detect the light L emitted by the status light 132. The light L emitted by the status lights 132 is modulated by the cordset processor 130 in a manner that is detectable by the light sensor 18 associated with an electric vehicle 100 or an external light sensor 154 associated with an external diagnostic visualizer 150. However, the modulations of the light L may not be discernable by a user observing the light L. While the status lights 132 are illustrated in FIG. 1 as being discrete circular lights, it should be appreciated that the status lights 132 may assume any shape. For example, the status lights 132 may be provided as bands surrounding the cordset controller 126, capable of emitting light in any direction around the cordset controller 126 so that observance of the modulating light L is not limited to a single surface of the cordset controller 126.

The grid plug overheat detection circuit 134 monitors the temperature of the connection between the cordset 104 and the power supply 12. The grid plug overheat detection circuit 134 includes a temperature sensing device 144 such as a thermistor or a thermocouple, for detecting changes, and particularly an increase, in temperature in the wiring system adapter 122. In alternative aspects, the temperature sensing device 144 is provided in the power supply 12, such as in the receptacle 124, which then communicates a status of the temperature in the receptacle 124 with the cordset controller 126. Communication between the power supply 12 and cordset processor 130 may occur through power line communication, a secondary communication cable provided in the cordset 104, or via wireless communication, using wireless communication protocols, such as 802.11, BLUETOOTH (R), etc. If the detected temperature change is outside of a temperature range for operating the cordset 104 and charging the electric vehicle 100, the grid plug overheat detection circuit 134 will terminate power to the electric vehicle 100 from the cordset 104.

The ground fault detection circuit 136 includes a current monitoring sensor 146, which detects mismatches in the amount of current flowing between the hot and neutral wires of the cordset 104. The ground fault detection circuit 136 cuts power to the cordset 104 when a mismatch of more than a few milliamps is detected. The cordset 104 may include a battery or back-up power supply 148 connected to the cordset controller 126 in the case of termination of power to the cordset 104 to allow the cordset controller 126 to indicate the status of the cordset 104. If the ground fault detection circuit 136 detects a mismatch in current between the hot and neutral wires of the cordset 104 greater than a given setpoint, the ground fault detection circuit 136 will terminate power to the electric vehicle 100 from the cordset 104.

The grid plug loss of ground detection circuit 138 monitors for faulty ground connection in the electric vehicle 100 electrical system between the vehicle battery/chassis ground and an electronic control unit in the vehicle. This grid plug loss of ground detection circuit 138 may be located in the vehicle adapter 120 or in the electronic control unit 22 of the vehicle itself. If located within the electric vehicle 100, a communication between the electric vehicle 100 and cordset processor 130 may occur through power line communication, a secondary communication cable provided in the cordset 104, or via wireless communication, using wireless communication protocols, such as 802.11, BLUETOOTH®, etc. If a grid plug loss of ground is detected by the grid plug loss of ground detection circuit 138, even if it is just a partial loss, the grid plug loss of ground detection circuit 138 will terminate power to the electric vehicle 100 from the cordset 104.

The controller internal failure detection circuit 140 monitors the circuitry within the cordset 104. The controller internal failure detection circuit 140 performs various functions including monitoring the consistency of the oscillator and inspecting logs to determine that the methods, embodied by the coded instructions, are being executed without error. If an internal failure is detected in the cordset controller 126, the controller internal failure detection circuit 140 will terminate power to the electric vehicle 100 from the cordset 104.

The computer readable storage device or media 142 may include volatile and non-volatile storage in read-only memory (ROM), random-access memory (RAM), and keep alive memory (KAM), for example. KAM is a persistent or non-volatile memory that may be used to store various operating variables while the cordset processor 130 is powered down. The computer-readable storage device or media 142 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the cordset processor 130. In aspects, the storage device 142 includes a look-up table that provides instructions to encode at least the first status light 132 for a particular fault identified by logic in the cordset processor 130.

Figure 4:
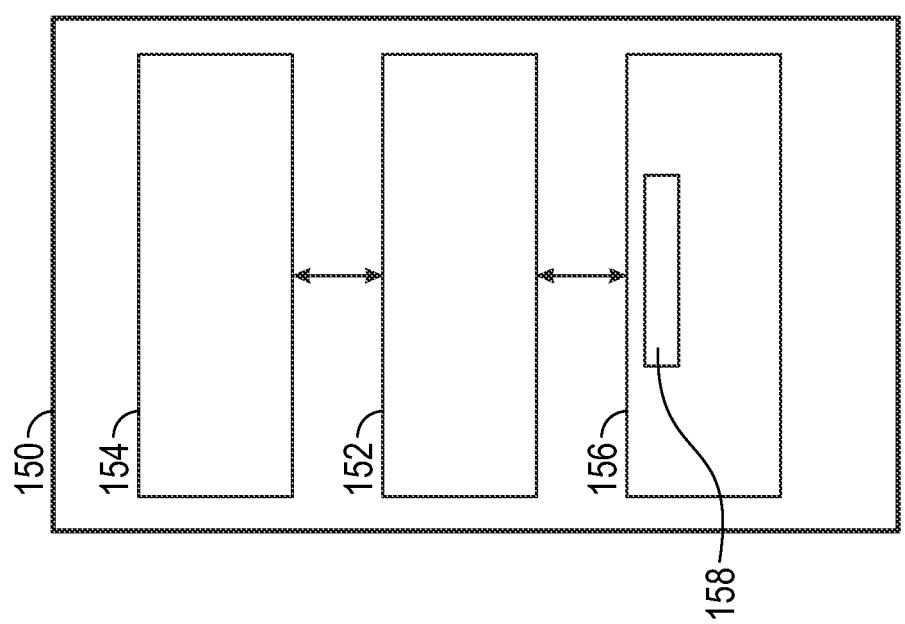
FIG. 4 illustrates a schematic diagram of an external diagnostic visualizer according to aspects of the present disclosure.

In addition, in aspects of the above, an external diagnostic visualizer 150 is associated with the cordset 104, as illustrated in FIGS. 1 and 4. The external diagnostic visualizer 150 may include, for example, a smart phone associated with, for example, the user or a diagnostics unit, which may be located in a repair garage. The external diagnostic visualizer 150 includes an external visual processing module 152. The external visual processing module 152 may include a custom made or commercially available processor, a central processing unit (CPU), a graphics processing unit (GPU), an auxiliary processor among several processors associated with the external visual processing module 152, a semiconductor-based microprocessor (in the form of a microchip or a chip set), a microprocessor, a combination thereof, or generally a device for executing instructions. In aspects, more than one external visual processing module 152 may be present, wherein processing is distributed across the multiple external visual processing module 152, as in the case of parallel processing. The external diagnostic visualizer 150 may include an application, i.e., a software program or a set of instructions for decoding the modulated light L emitted from the cordset controller 126. The application may also include instructions for identifying the electric vehicle 100 and displaying the fault to the user as well as, in aspects, identifying the location of the electric vehicle 100, ambient conditions in which the cordset 104 and electric vehicle 100 are located. The application may be stored within the computer readable storage device 142 or in additional or separate memory.

The external diagnostic visualizer 150 also includes an external light sensor 154 connected to the external visual processing module 152, such as a photo-sensor, a complementary metal-oxide-semiconductor, and a charged coupled device. The external light sensor 154 detects light emitted from the cordset 104. That is, the external light sensor 154 is configured to detect light L at wavelengths and frequencies emitted from the cordset 104. As noted above, such wavelengths may include those in the visible spectrum as well as, or alternatively, those in the infrared or ultraviolet spectrum. As illustrated in FIG. 4, the external light sensor 154 is connected to the external visual processing module 152. In aspects where the external diagnostic visualizer 150 is a smart phone, the external light sensor The external diagnostic visualizer 150 further includes an external display 156 connected to the external visual processing module 152 as illustrated in FIG. 4. The external display 156 is visually accessible to users outside of or within the electric vehicle 100. The external display 156 includes a graphic user interface 158 that the user may interact with using, for example, a touch screen integrated into the graphic user interface 158 or an electro-mechanical interface connected to external diagnostic visualizer 150. The external diagnostic visualizer 150 may also include an external communication system 160 configured to wirelessly communicate information from the external video processing module 152 to an external entities 32, such as but not limited to, other vehicles ("V2V" communication), infrastructure ("V2I" communication), and/or remote systems at a remote call center (e.g., ON-STAR by GENERAL MOTORS). In certain embodiments, the external communication system 160 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the external communication system 160 may include one or more antennas and/or transceivers for receiving and/or transmitting signals, such as cooperative sensing messages (CSMs).

The cordset processor 130 is configured to execute diagnostic instructions. The diagnostic instructions may include one or more separate programs, each of which comprises an ordered listing of executable instructions for implementing logical functions. The diagnostic instructions, when executed by the cordset processor 130, receive and process signals from the various circuits present in the cordset controller 126, perform logic, calculations, methods and/or algorithms for driving the status lights 132 and depending on the faults, if any, detected by the cordset controller 126, alter the modulation of the light emitted by at least the first status light 132, and in some aspects the second status light, to provide an encoded signal.

In a non-limiting example, if no faults are present, the second status light 132 is illuminated and the first status light is not. If a ground fault failure is detected, the first status light 132 may be encoded at a 60 percent duty cycle, wherein the first status light 132 is lit for 60 percent of a given time period. For a grid plug overheat failure, the encoded light signal emitted by the first status light 132 may encoded at a 70 percent duty cycle, wherein one or more of the status lights 132 are lit for 70 percent of a given time period. For a loss of grid plug ground, the encoded light signal emitted by the first status light 132 may be encoded at an 80 percent duty cycle, wherein one or more of the status lights 132 are lit for 80 percent of a given time period. And for a controller internal failure, the encoded light signal emitted by the first status light 132 may be encoded at a 90 percent duty cycle, wherein one or more of the status lights 132 are lit for 90 percent of a given time period. It should therefore be appreciated that the duty cycle of the light may be set in the range of 10 percent to 100 percent, wherein the duty cycle is understood as the percentage of time that the status light is in on during a given time period. In aspects, the time period for which the duty cycle is calibrated is determined by the frame rate of the light sensor 18, 154. Accordingly, in the examples above, if a frame rate of 30 frames per second is used by the light sensor 18, 154, for a 60 percent duty cycle the status light 132 will be on for 18 of the 30 frames and off for 12 of the 30 frames wherein periods of on and off may be consecutive or alternated. The duty cycle may be adjusted to accommodate a light sensor 18, 154 that operates at 30 frames per second; or alternatively, greater than 30 frames per second, such as in the range of 31 frames per second to 60 frames per second, or less than 30 frames per second, such as in the range of 20 frames per second to 29 frames per second. Accordingly, a vast number of fault indicators may be encoded through adjusting the duty cycle of the status light 132 and modulating the status light 132 accordingly.

Figure 5:
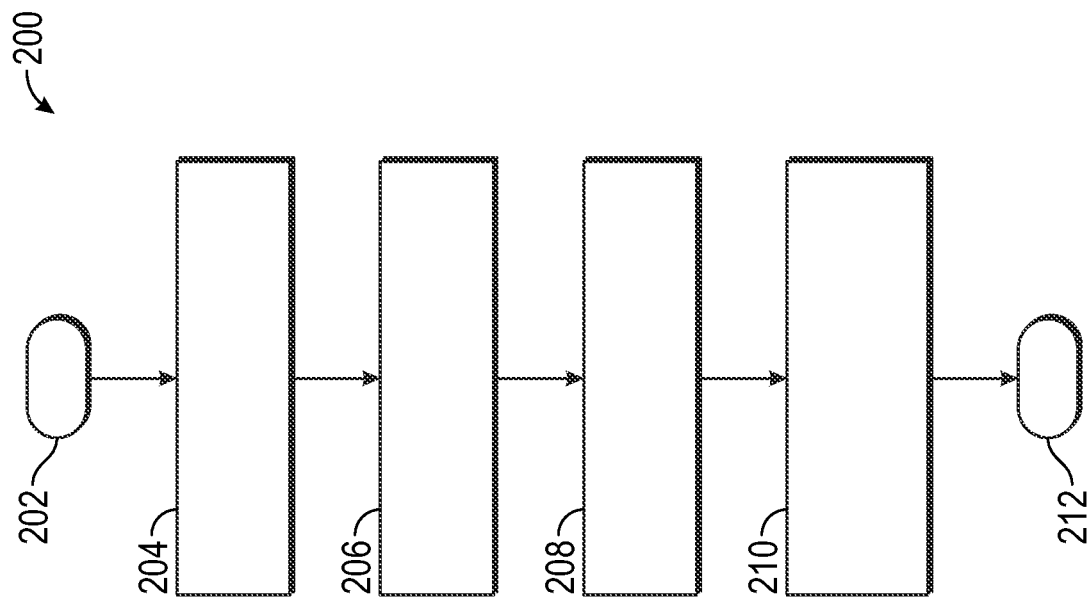
FIG. 5 illustrates a method of encoding a fault in a cordset controller according to aspects of the present disclosure.

Thus, the diagnostic instructions carry out a method of identifying, encoding, and displaying a fault by the cordset controller 126, an aspect of which is illustrated in FIG. 5. The method 200 begins at block 202 where the cordset 104 is connected the electric vehicle 100 for charging. A second status light 132 on the cordset controller 126 may indicate that the cordset 104 is charging and the cordset controller 126 is monitoring the status of the cordset 104 for faults. At block 204, a fault is identified in one of the fault detection circuits by the cordset processor 130 and power supplied to the electric vehicle 100 by the cordset 104 is terminated either by the circuit in the cordset controller 126 that triggered the fault or by the cordset controller 126. At block 206 the cordset controller 126 turns off the status light 132 used to indicate that the cordset 104 is charging or ready to charge. At block 208, the cordset controller 126 having already identified the fault, turns on the first status light 132 indicating a fault in the cordset 104 and, at block 210, the cordset controller 126 encodes the type of the fault and modulates the light emitted by the first status light 132 accordingly. At block 212, the protocol is terminated until the fault in the cordset 104 is addressed.

The light L emitted by the status lights 132 is then detected by a light sensor, such as the light sensor 18 present in the electric vehicle 100, or the external light sensor 154 associated with an external diagnostic visualizer 150, such as a smart phone. The external diagnostic visualizer 150 is configured to execute decoding instructions to detect and interpret the light emitted by the status lights 132 of the cordset controller 126 and display information regarding the decoded light emitted in a manner comprehensible by the user. The decoding instructions may include one or more separate programs, each of which comprises an ordered listing of executable instructions for implementing logical functions. The decoding instructions, when executed by the cordset processor 130, receive and process signals from the various circuits present in the cordset controller 126, perform logic, calculations, methods and/or algorithms for driving the status lights 132 and depending on the faults, if any, detected by the cordset controller 126, alter the modulation of the light emitted by the status lights 132.

Figure 6:
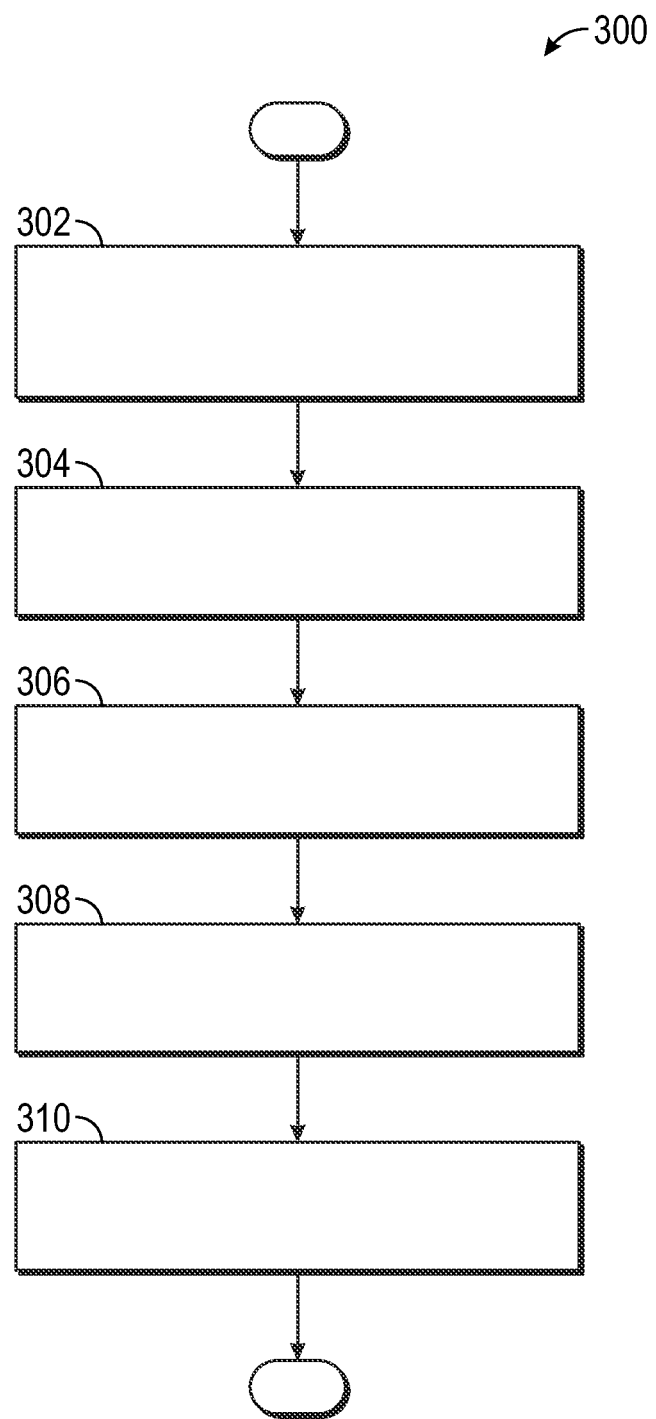
FIG. 6 illustrates a method of decoding a fault communicated by a cordset controller by the electric vehicle according to aspects of the present disclosure.

In aspects, the visual processing module 24 in the electric vehicle 100 executes decoding instructions to decode the encoded, modulated light L emitted by the cordset controller 126. FIG. 6 illustrates an aspect of a method carried out in executing decoding instructions to discern the fault detected by the cordset controller 126. The method 300 begins at block 302 wherein a request for charging is detected. This request may be initiated by plugging the vehicle adapter 120 into the electric vehicle 100. At block 304, the visual processing module 24 enables the light sensor 18. At block 306, the visual processing module 24 identifies the cordset controller 126, or the light emitted from the status lights 132 of the cordset controller 126 with the light sensor 18. At block 308 the visual processing module 24 decodes the modulation of the light L emitted by the status light 132 and at block 310 the visual processing module 24 displays the cause of the fault on the display 20.

Figure 7:
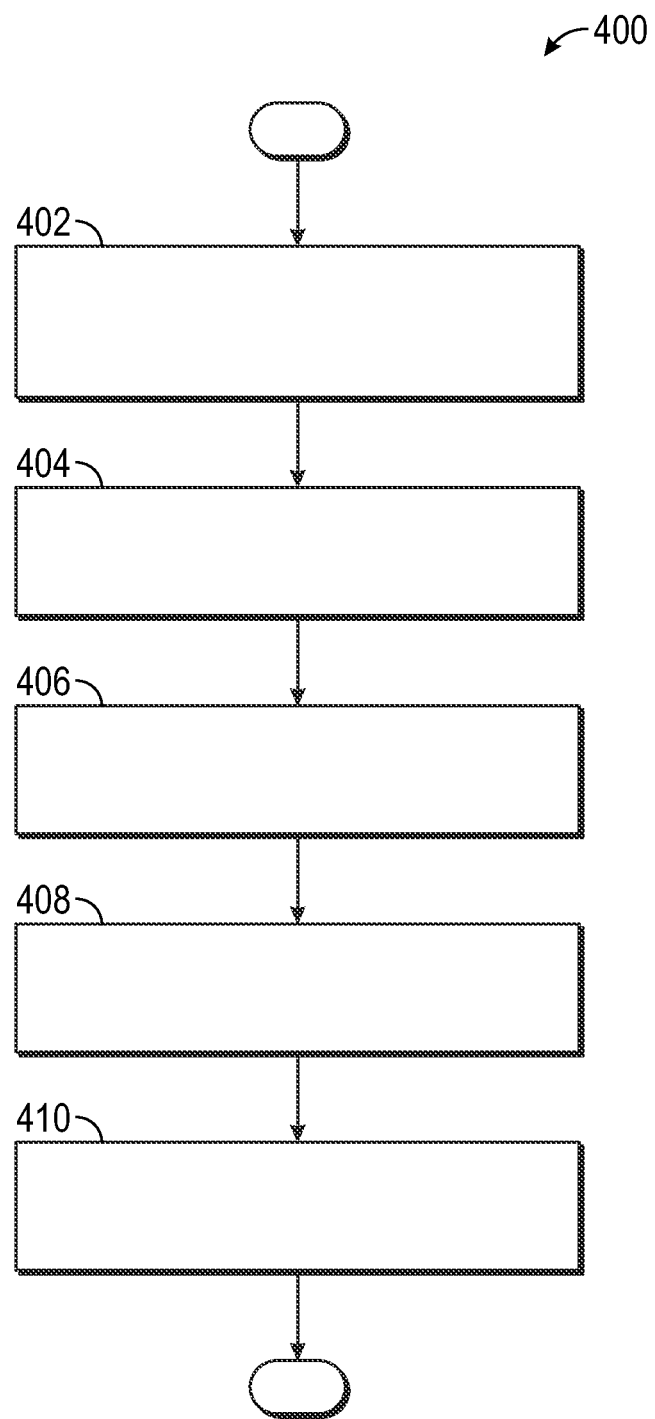
FIG. 7 illustrates a method of decoding a fault communicated by a cordset controller by the external diagnostic visualizer according to aspects of the present disclosure.

In additional, or alternative, aspects the external visual processing module 152 of the external diagnostic visualizer executes instructions to decode the encoded light emitted by the cordset controller 126. FIG. 7 illustrates an aspect of a method carried out in an application that executes instructions to decode the fault detected by the cordset controller 126. The method 400 begins at block 402 wherein an application is enabled by the user in the external diagnostic visualizer 150. At block 404, the external visual processing module 152 enables the external light sensor 154. At block 406, the external visual processing module 152 identifies the cordset controller 126, or the light emitted from the status lights 132 of the cordset controller 126 with the external light sensor 154. At block 408 the external visual processing module 152 decodes the modulation of the light L emitted by the status light 132 and at block 410 the external visual processing module 152 displays the cause of the fault on the external display 156.

Figure 8:
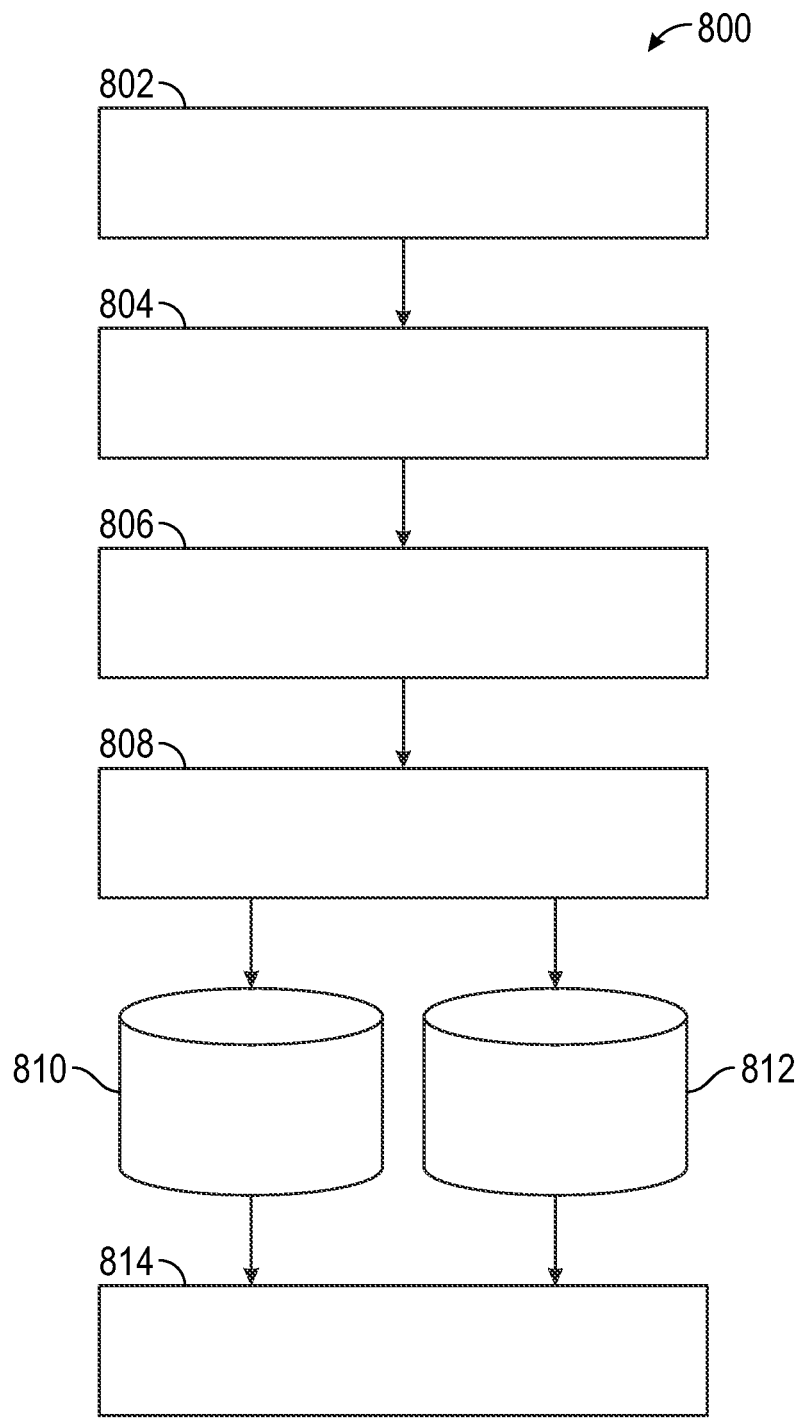
FIG. 8 illustrates a method of reporting fault data communicated by a cordset controller by the electric vehicle or external diagnostic visualizer according to aspects of the present disclosure.

As noted above, the fault data captured by the electric vehicle 100 or the external diagnostic visualizer 150 from the cordset 104 can be transferred by a communication system 30, 160 to external entities 32, including those noted above as well as data centers, for usage in identifying and tracking faults identified by a given cordset controller 126. FIG. 8 illustrates a method of communicating the fault information. The method 800 begins at block 802 with the identification of a fault by either the electric vehicle 100 or the external diagnostic visualizer 150 as communicated by the cordset controller 126. At block 804, the cordset 104 is identified by the electric vehicle 100 or the external diagnostic visualizer 150 in addition to other identifying information as well as any environmental factors that may be monitored by the electric vehicle 100 or the external diagnostic visualizer 150, such as the temperature of the environment in which the cordset 104 is located. At block 806 the location of the cordset 104 is identified by the by the electric vehicle 100 or the external diagnostic visualizer 150. At block 808, information regarding the fault is transferred to an external entity 32, such as one or more data centers, wherein cordset 104 related faults 810 and infrastructure (i.e., home electric wiring) related faults 812 are stored. Transferring of the faults may occur through any one of a number of communication protocols including, but not limited, over the internet, through telemetric modules present in the electric vehicle 100, wirelessly via communication protocols including 802.11, BLUETOOTH, cellular communications, etc. At block 814, these faults are made accessible to engineers, suppliers, dealers, and repair shops to assist in addressing faults that have been identified.

The system and process for providing cordset fault status indicators of the present disclosure offer several advantages. These advantages may include the ability to effectively communicate the presence of a fault and, if present, the general location of the problem causing the fault. These advantages may further include the reduction in warranty claims as it allows for the identification of the source of a fault, including whether the fault is within the cordset, vehicle, or within the home electrical wiring system, including in a GFCI outlet, which saves money and time for both the user and the cordset supplier. These advantages further include the ability to receive and review the transmitted diagnostic data on a smartphone and vehicle interface terminals.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electric vehicle cordset, comprising:
   a cordset controller, the cordset controller including:
   a cordset processor,
   a plurality of fault detection circuits connected to the cordset processor, and
   a first status light connected to the cordset processor,
   wherein the cordset processor is configured to:
   identify a fault in at least one of the plurality of fault detection circuits, terminate power in the cordset,
   turn on the first status light indicating the fault is present, and
   encode the fault in the first status light through modulating the first status light,
   wherein the fault is encoded by altering a duty cycle of the first status light, and
   wherein a time period of the duty cycle for the fault is calibrated based on a frame rate of a light sensor in at least one of a vehicle and an external diagnostic visualizer.

2. The electric vehicle cordset of claim 1, further comprising a cordset cable including a vehicle adapter at a first end of the cordset cable and wiring system adapter at a second end of the cordset cable, wherein the cordset controller is connected to the cordset cable.

3. The electric vehicle cordset of claim 1, wherein the plurality of fault detection circuits includes one or more of the following: a grid plug overheat detection circuit, a ground fault detection circuit, a grid plug loss of ground detection circuit, and a controller internal failure detection circuit.

4. The electric vehicle cordset of claim 1, wherein the cordset processor is further configured to: turn off a second status light that indicates the cordset is charging.

5. The electric vehicle cordset of claim 4, wherein the second status light is green, and the first status light is amber.

6. A system for identifying faults in an electric vehicle cordset, comprising:
   a cordset controller, the cordset controller including:
   a cordset processor,
   a plurality of fault detection circuits connected to the cordset processor, and
   a first status light connected to the cordset processor,
   wherein the cordset processor is configured to: identify a fault in at least one of the plurality fault detection circuits, terminate power in the cordset, turn on the first status light indicating the fault is present, and encode the fault in the first status light through modulating the first status light; and
   an electric vehicle, the electric vehicle including:
   a first visual processing module,
   a first light sensor connected to the first visual processing module, and
   a first display connected to the first visual processing module,
   wherein the first light sensor is configured to detect light emitted by the first status light, the first visual processing module is configured to decode the fault encoded in the modulated first status light, and the first display is configured to display the fault decoded by the first visual processing module.

7. The system for identifying faults in an electric vehicle cordset of claim 6, wherein the fault is encoded by altering a duty cycle of the first status light.

8. The system of claim 6, wherein a time period of the duty cycle for the fault is calibrated based on a frame rate of the first light sensor.

9. The system for identifying faults in an electric vehicle cordset of claim 6, wherein the plurality of fault detection circuits includes one or more of the following: a grid plug overheat detection circuit, a ground fault detection circuit, a grid plug loss of ground detection circuit, and a controller internal failure detection circuit.

10. The system for identifying faults in an electric vehicle cordset of claim 6, wherein the cordset processor is further configured to: turn off a second status light indicating the cordset is charging.

11. The system for identifying faults in an electric vehicle cordset of claim 6, further comprising a communication system, wherein the communication system is configured to transfer the fault to an external entity.

12. The system for identifying faults in an electric vehicle cordset of claim 6, further comprising an external diagnostic visualizer.

13. The system for identifying faults in an electric vehicle cordset of claim 12, wherein the external diagnostic visualizer includes:
    an external visual processing module,
    an external light sensor connected to the external visual processing module, and
    an external display connected to the external visual processing module,
    wherein the external light sensor is configured to detect light emitted by the first status light, the external visual processing module is configured to decode the fault encoded in the modulated first status light, and the external display is configured to display the fault decoded by the external visual processing module.

14. The system for identifying faults in an electric vehicle cordset of claim 12, wherein the external diagnostic visualizer includes an external communication system, wherein the external communication system is configured to transfer the fault to an external entity.

15. The system for identifying faults in an electric vehicle cordset of claim 12, wherein the external diagnostic visualizer is a smart phone.

16. The system for identifying faults in an electric vehicle cordset of claim 12, wherein the external diagnostic visualizer is a diagnostics unit.

17. The system of claim 6, wherein the modulation of the first status light is not discernable by a user observing the light.

18. A method of identifying faults in an electric vehicle cordset, comprising:
    identifying a fault in a cordset with a fault detection circuit included in a cordset controller, wherein the cordset controller also includes a cordset processor and a first status light connected to the cordset processor;
    terminating power in the cordset;
    indicating the fault is present with the first status light in the cordset controller; and
    encoding the fault in the first status light through modulating the first status light using the cordset processor included in the cordset controller;

detecting light emitted by the first status light with at least one of a first light sensor in a vehicle and an external light sensor in an external diagnostic visualizer; and decoding the fault encoded in the first status light with a first visual processing module when light is detected by the first light sensor and with an external visual processing module when light is detected by the external light sensor; and displaying the fault decoded by the first visual processing module with a first display when light is detected by the first light sensor and an external display when light is detected by the external visual processing module.

19. The method of claim 18, further comprising transferring the fault to an external entity with a first communication system.

20. The method of claim 18, wherein the fault is encoded by altering a duty cycle of the first status light, and wherein a time period of the duty cycle for the fault is calibrated based on a frame rate of at least one of a first light sensor in a vehicle and an external light sensor in an external diagnostic visualizer.

* * * * *